(12) United States Patent
Hsu et al.

(10) Patent No.: US 10,040,121 B2
(45) Date of Patent: Aug. 7, 2018

(54) METHOD FOR FORMING AN INTERCONNECT OF A SOLID OXIDE FUEL CELL

(75) Inventors: Wei-Hsun Hsu, Miaoli (TW); Chi-Hsun Ho, Miaoli (TW); Huei-Long Lee, Miaoli (TW); Dyi-Nan Shong, Miaoli (TW); Shun-Fa Chen, Miaoli (TW); Tsung-Lin Yeh, Miaoli (TW); Chiu-Lung Chu, Miaoli (TW)

(73) Assignee: Porite Taiwan Co., Ltd., Miaoli (TW)

( * ) Notice: Subject to any disclaimer, the term of this patent is extended or adjusted under 35 U.S.C. 154(b) by 249 days.

(21) Appl. No.: 12/777,863

(22) Filed: May 11, 2010

(65) Prior Publication Data

US 2011/0135531 A1 Jun. 9, 2011

(30) Foreign Application Priority Data

Dec. 9, 2009 (TW) .............................. 98142051 A

(51) Int. Cl.
| | | |
|---|---|---|
| *C22C 32/00* | (2006.01) | |
| *B22F 1/00* | (2006.01) | |
| *B22F 3/24* | (2006.01) | |
| *C22C 1/04* | (2006.01) | |
| *H01M 8/0206* | (2016.01) | |
| *H01M 8/0232* | (2016.01) | |
| *H01M 8/12* | (2016.01) | |

(52) U.S. Cl.
CPC .............. *B22F 3/24* (2013.01); *C22C 1/045* (2013.01); *H01M 8/0206* (2013.01); *H01M 8/0232* (2013.01); *H01M 8/12* (2013.01); *B22F 2003/242* (2013.01); *B22F 2998/10* (2013.01)

(58) Field of Classification Search
USPC .................................................. 419/26, 39
See application file for complete search history.

(56) References Cited

U.S. PATENT DOCUMENTS

| | | | | |
|---|---|---|---|---|
| 5,689,796 A | * | 11/1997 | Kasai et al. | ..................... 419/32 |
| 6,548,012 B2 | * | 4/2003 | Lefebvre et al. | ............... 419/27 |
| 7,390,456 B2 | | 6/2008 | Glatz et al. | |
| 2007/0157693 A1 | * | 7/2007 | Chiesa | .............................. 72/67 |
| 2010/0233576 A1 | * | 9/2010 | Brandner et al. | ............. 429/491 |

OTHER PUBLICATIONS

Powder Metallurgy for Manufacturing, Powder Processes, http://thelibraryofmanufacturing.com/powder_processes.html, Mar. 3, 2018, 7 pages.
Powder Metallurgy Stainless Steels: Processing, Microstructures, and Properties, Chapter 4, Compacting and Shaping, pp. 1-2.
Remarks from Response to Office action dated Feb. 5, 2007, 3 pages.

\* cited by examiner

*Primary Examiner* — Haytham Soliman
(74) *Attorney, Agent, or Firm* — Finnegan, Henderson, Farabow, Garrett & Dunner, LLP

(57) ABSTRACT

A method for forming an interconnect of a solid oxide fuel cell includes the following steps. First of all, a powder mixture substantially including equal to or more than 90 wt % chromium powder, with the balance being iron powder and inevitable impurities, is provided. Then the powder mixture is pressurized by a pressing process with a pressure equal to or over 8 mt/cm$^2$ to form a green interconnect with a density being equal to or over 90% of the theoretical density. Next the green interconnect is sintered by a sintering process to form an interconnect body. Finally, a protection process is performed on at least one surface of the interconnect body to form an interconnect.

22 Claims, 3 Drawing Sheets

METHOD FOR FORMING AN INTERCONNECT OF A SOLID OXIDE FUEL CELL

CROSS-REFERENCE TO RELATED APPLICATIONS

The entire contents of Taiwan Patent Application No. 098142051, filed on Dec. 9, 2009, from which this application claims priority, are incorporated herein by reference.

BACKGROUND OF THE INVENTION

1. Field of the Invention

The present invention relates to a method for forming an interconnect of a solid oxide fuel cell, and more particularly to a powder metallurgy method for forming an interconnect of a solid oxide fuel cell.

2. Description of Related Art

High temperature solid oxide fuel cells (SOFCs) comprise what is referred to as oxygen-ion conducting solid state metal oxide electrolyte, which can be, for example, cubic phase stabilized zirconia, with operating temperatures ranging from 700° C. to 1000° C., using as a fuel hydrogen from either natural hydrogen-rich materials such as alkanes or regenerative materials such as bioethanol. Under high temperature, hydrogen gas is produced by chemical reformation to prevent the use of noble metal catalysts. Due to the characteristic of high temperature, the SOFC has a high tolerance among the various fuels currently utilized. Dependence on the single fuel source of conventional electrical power generation can be relieved, as one advantage of the SOFC. The degree of being able to directly generate electrical power by way of the chemical electrical power provided by the SOFC is higher than that of current electrical power generation equipment using mechanical power transformation. The electrical power generating efficiency of the SOFC could reach more than 40%. Furthermore, due to the high operating temperature of an SOFC, exhaust heat energy of SOFC reactions can be recycled for cogeneration so as to increase the total efficiency of electrical power generation of the SOFC up to 80%.

FIG. 1 shows a conventional arrangement of a flat plate SOFC. The flat plate SOFC comprises an anode 10, a solid oxide electrolyte 12, a cathode 14, an interconnect 16 for holding the SOFC (also known as a bipolar plate), a sealant, etc.

In the depicted SOFC arrangement, the interconnect 16 places the cathode and the anode of two adjacent cells respectively, into electrical communication with one another. Since a single fuel cell, including a cathode, an anode and an electrolyte, can only generate a limited amount of electrical power, a plurality of single fuel cells are connected in serial to generate enough voltage for efficient utilization. Thus the material of the interconnect must have a high conductivity under both cathode and anode environments. Furthermore, the interconnect must isolate the fuel from air, and the material must be condensed and hermetic. Because the interconnect 16 is usually exposed under the environments of oxidation and reduction, the material of the interconnect 16 must have chemical stability under both atmospheres. Moreover, since the operating temperature of the SOFC is high, the material of the interconnect must have superior stability against high temperature oxidation.

The solid electrolyte layer (cf. 12), having been dimensioned in early stages of conventional SOFC development to be much thicker than that of later designs, often results in poor ion mobility and inadequate cell performance. Therefore, operation of the SOFC must be at an ultra high temperature of around 1000° C. so as to improve the cell performance. Accordingly, the early-developed interconnect (cf. 16) is made of high temperature resistant ceramic, such as $LaCrO_3$-based ceramic. However, ceramic materials are fragile, hard to manufacture, and expensive (80% of the total production cost of the flat plate SOFC). Following such ceramic implementations came metal interconnects leading to reduction of the thickness of the electrolyte of SOFC, newly discovered electrolyte, and the decrease of the operating temperature down to 800° C.

Compared to ceramic, metal offers high electrical, thermal conductivity, easy manufacture and low cost. High temperature alloys commonly used for interconnects of SOFCs include chrome base alloy, nickel base alloy and iron base alloy (stainless steel), wherein the thermal expansion coefficient of nickel base alloy does not match other components of SOFC, and only the thermal expansion coefficient of ferrite stainless steel matches other components of the SOFC so as to be suitable for operating temperatures in a range of 600° C. to 800° C. The suitable operating temperature for chrome base alloy is near 1000° C.

Therefore, a new method of manufacturing an interconnect of chrome base alloy is needed to improve product quality and decrease production cost.

SUMMARY OF THE INVENTION

An object of the present invention is to provide a new method for forming an interconnect of a solid oxide fuel cell, particularly for chrome base alloy interconnect manufacture.

According to the object, the present invention provides an embodiment for forming an interconnect of a solid oxide fuel cell according to a method that comprises the following steps. First of all, a powder mixture is provided, wherein the powder mixture includes a metal powder and a lubricant. The metal powder is neither mechanical alloy nor master alloy. The metal powder substantially comprises an amount equal to or more than 90 wt % chrome powder, with the balance being iron powder and inevitable impurities. Then, a pressing process is performed on the mixture by a computer numerical control (CNC) hydraulic pressing machine with a pressure equal to or over 8 metric ton/cm² (hereinafter denoted as $mt/cm^2$) to form a green interconnect with a density equal to or over 90% of the theoretical density. The density of the green interconnect increases as the pressure applied in the pressing process increases. Next, a sintering process is performed on the green interconnect to form an interconnect body. Finally, a protecting process is performed on at least one side of the interconnect body to form the interconnect.

According to the object set forth above, another embodiment of the invention for forming an interconnect of a solid oxide fuel cell operates according to a method which comprises, first of all, providing a powder mixture substantially comprising 90 wt % or more of chrome powder with the balance being iron powder and inevitable impurities, followed by a pressing process being performed on the powder mixture with a pressure equal to or over 8 $mt/cm^2$ to form a green interconnect having a density equal to or over 90% of the theoretical density. Next, a sintering process is performed on the green interconnect to form an interconnect body. Finally, a protecting process is performed on at least one surface of the interconnect body to form an interconnect.

In furtherance of the object, a method for forming an interconnect body of a solid oxide fuel cell is disclosed in still another inventive embodiment, which comprises steps including the provision of a powder mixture at or above about 90 wt % chrome powder, with the balance comprising one or more of iron powder and impurities, is provided. Then a pressing process is performed on the powder mixture with a pressure of equal to or over about 8 mt/cm$^2$ to form a green interconnect with a density at or above about 90% of a theoretical density. Finally, a sintering process is performed on the green interconnect to form an interconnect body.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

DETAILED DESCRIPTION OF THE PREFERRED EMBODIMENTS

A detailed description of the present invention will now be provided with reference to the following embodiments, which are not intended to limit the scope of the present invention and which can be adapted for other applications. In addition to those provided herein, the invention can also be performed in the context of other embodiments. Any modification, alternative and equivalent of the following embodiments is included in the scope of the invention which is intended to be limited solely by the appended claims. In the description of this specification, details are provided for facilitating the understanding of one with ordinary skill in the art. The invention can still be performed without certain details; furthermore, well-known steps or components are not specifically described to avoid unnecessarily obscuring or limiting the invention.

Figure 1:
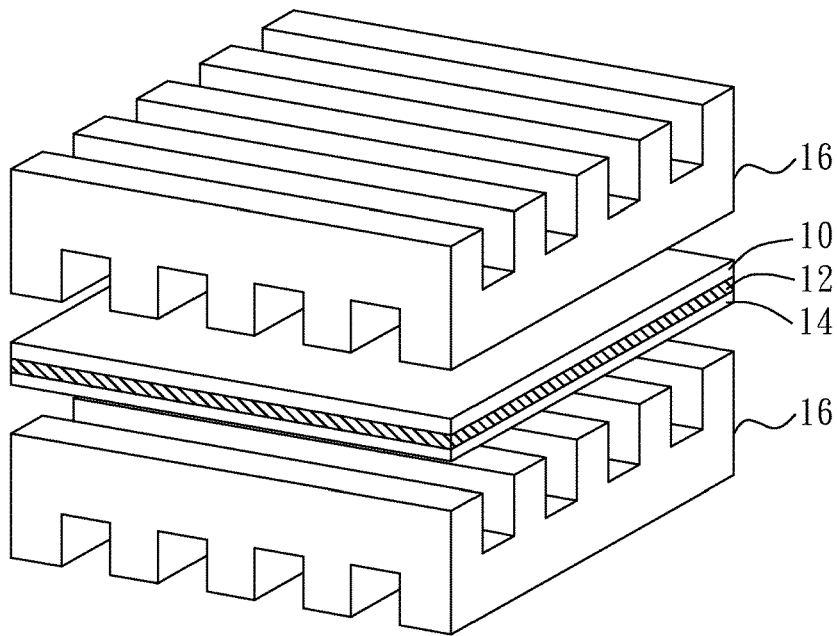
FIG. 1 is a schematic illustration of a conventional connecting structure used with a flat plate solid oxide fuel cell.
Figure 2:
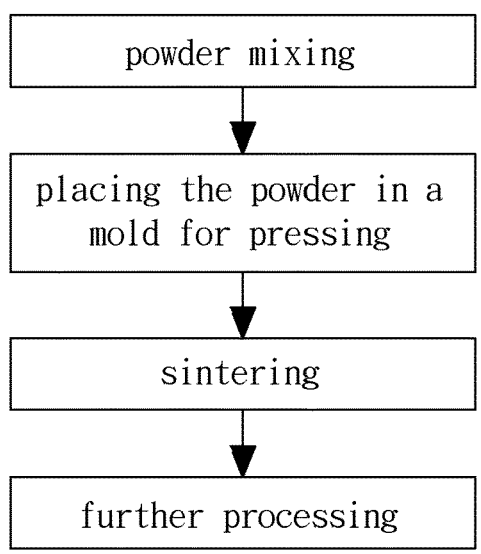
FIG. 2 shows a process flow of powder metallurgy.

Powder metallurgy, which belongs to non-cutting methods, has advantages of material conservation, work savings, suitability for mass production, low production cost, and good mechanical properties, and is in wide use by industries. The principle of powder metallurgy is to mix metal or alloy powder and place the powder in a mold for pressing. The process flow is shown in FIG. 2.

The pressed metal or alloy powder is then sintered at a temperature under the melting point to form a metal workpiece or a metal piece. In particular, green compact formed by the pressing is heated to sinter and to increase the density, hardness, and strength thereof, and to improve the mechanical properties. As mentioned, the sintering temperature is generally under the melting point and is about ⅔ of the melting temperature. The sintering process is typically performed in one or more of a protective atmosphere and a vacuum environment, wherein the protective atmosphere is usually full of reducing gases such as hydrogen gas H$_2$, a mixture of H$_2$ gas and nitrogen gas N$_2$, natural gas, etc., or inert gases such as N$_2$, argon Ar, etc.

In actual application, most end products are ready-to-use after the sintering process. However, the sintered product can be further pressed and sintered to meet the requirement of a higher density. Particularly for the interconnect of SOFC manufactured by powder metallurgy, the density of the interconnect must be high due to the function and requirement of separating fuel from air. If the density of the green compact of a chrome base alloy interconnect formed by pressing does not achieve 90% of the theoretical density, further pressing and resintering processes are necessary which will increase the production cost. The following described embodiment of the invention discloses achieving the density of the green compact of a chrome base alloy interconnect formed by pressing equal to or over 90% of the theoretical density. Therefore, only one pressing process and one sintering process are needed to obtain interconnects which meet the requirements of quality thereby reducing the production cost.

Figure 3:
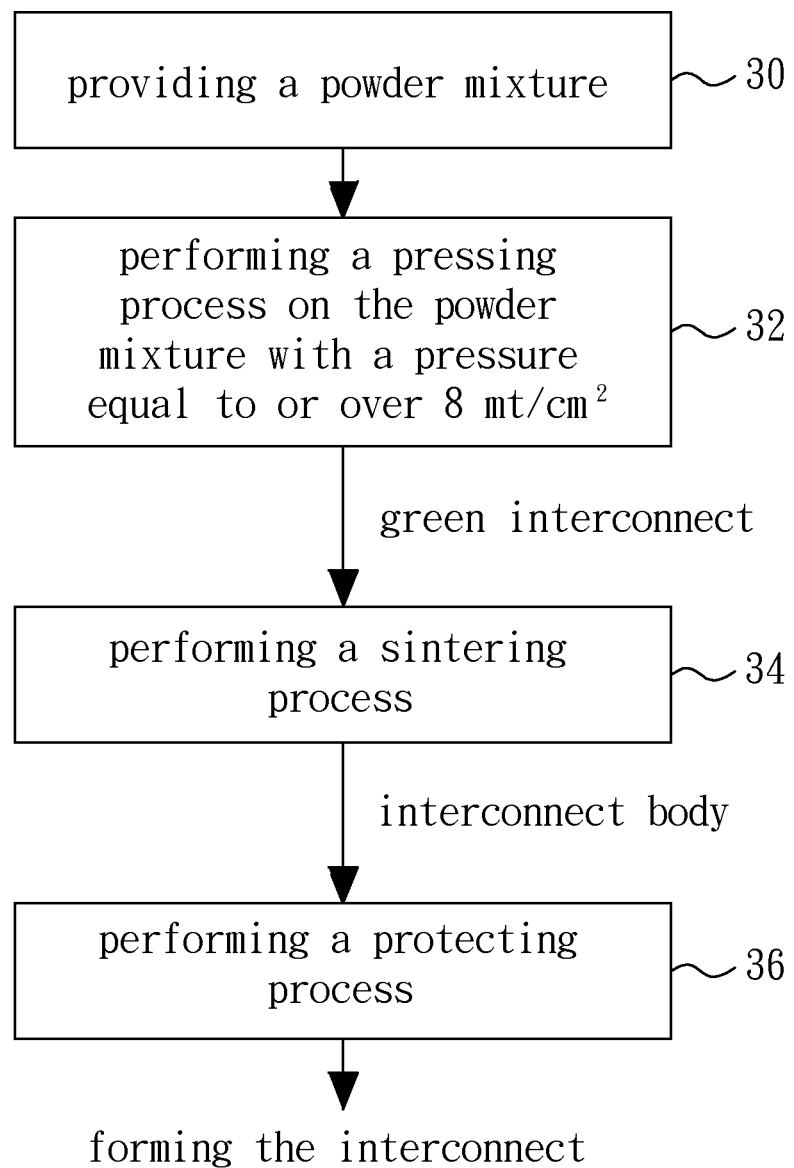
FIG. 3 shows a method for forming an interconnect of a solid oxide fuel cell according to one embodiment of the present invention.

FIG. 3 shows a method for forming an interconnect of a solid oxide fuel cell according to one embodiment of the present invention. The method comprises, first of all, step 30 in which a mixture is provided, wherein the mixture includes a metal powder and a lubricant. The metal powder is neither mechanical alloy nor master alloy. The metal powder substantially comprises equal to or more than 90 wt % chrome powder, with the balance being iron powder and inevitable impurities. The metal powder excludes rare earth metals, rare earth metal oxide, yttrium and/or yttria. In step 32, a pressing process is performed on the mixture by a CNC hydraulic pressing machine with a pressure equal to or over 8 mt/cm$^2$ to form a green interconnect. The density of the green interconnect is equal to or over 90% of the theoretical density. The density of the green interconnect increases as the pressure applied in the pressing process of step 32 increases. Next in step 34, a sintering process is performed to form an interconnect body. The temperature of the sintering process is equal to or over 1350° C. Finally, in step 36, a protecting process is performed on at least one side of the interconnect body to form the interconnect.

It is noted that the pressing process in step 32 is preferably performed by a computer numerical control (CNC) hydraulic pressing machine. Generally speaking, pressing machines can be divided into electromagnetic pressing machines, mechanical pressing machines, hydraulic pressing machines, and pneumatic pressing machines. In powder metallurgy, mechanical pressing machines are most commonly used. The mechanical pressing machine uses motion of cams, rods and hammer to generate pressure on powder in a mold. The advantage of the mechanical pressing machine is low cost while the disadvantages thereof include smaller pressure (less than 8 mt/cm$^2$) and unstable punch travelling control. Therefore, the manufacture of the chrome base alloy interconnect will typically need a secondary pressing process and a secondary sintering process if the mechanical pressing machine is used. Furthermore, the variation of the density of the chrome base alloy interconnect would not be small. In contrast, if the CNC hydraulic pressing machine is used in the manufacture of the chrome base alloy interconnect, the CNC hydraulic pressing machine not only provides a larger pressure (equal to or more than 8 mt/cm$^2$), but also can provide it with a precisely controllable punch travel. Therefore, only one pressing process and one sintering process are needed in the manufacture of the chrome base alloy interconnect to form a chrome base alloy interconnect with a high and uniform density.

Another advantage of using the CNC hydraulic pressing machine in the pressing process includes low cost of powder material. The powder used in the manufacture of the chrome base alloy interconnect can be a pure metal powder mixture if the CNC hydraulic pressing machine is used. Neither mechanical alloy or master alloy, nor rare earth metals, rare earth metal oxide, yttrium or yttria are needed to increase the stability of the chrome base alloy interconnect under high operating temperature. Therefore, the cost of material can be significantly reduced.

Figure 4:
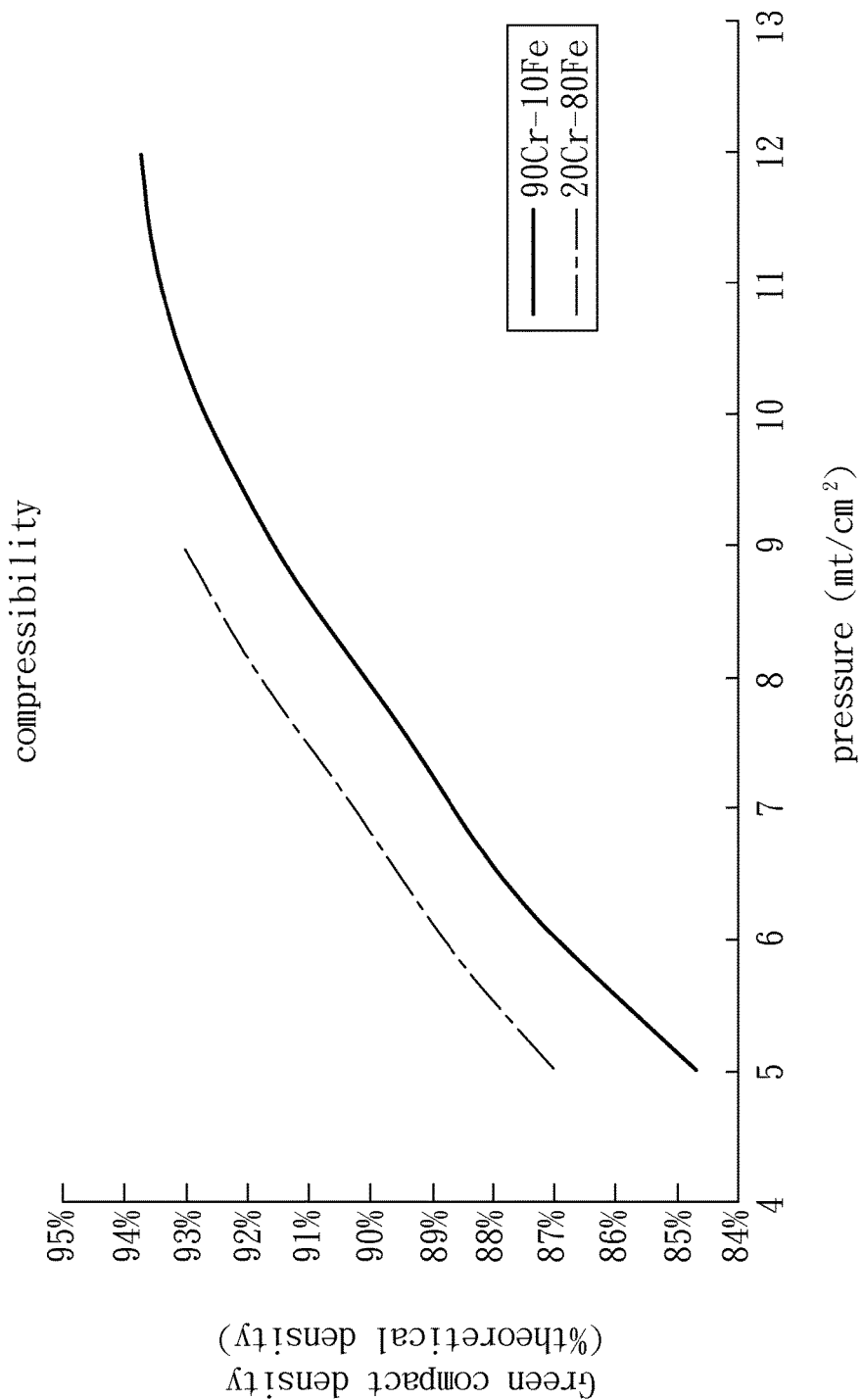
FIG. 4 shows curves of pressure vs. density of a low chrome base alloy (20% Cr-80% Fe) and a high chrome base alloy (90% Cr-10% Fe) respectively.

The density of the green compact will increase as the pressure applied by the pressing process is increased. However, the curve of pressure vs. density will vary with the composition or proportion of the powder. In the context of comparing two chrome base alloys with different compositions or proportions, including a low chrome base alloy (20% Cr-80% Fe) and a high chrome base alloy (90% Cr-10% Fe), FIG. 4 shows curves of pressure vs. density of the low chrome base alloy (20% Cr-80% Fe) and the high chrome base alloy (90% Cr-10% Fe) respectively. These two chrome base alloys are compared further in that which follows.

Referring to FIG. 4, for the low chrome base alloy (20% Cr-80% Fe), the density of the green compact of the interconnect can easily achieve 90% of the theoretical density if the pressure applied in the pressing process is over 7 t/cm$^2$. Contrarily, for high chrome base alloy (90% Cr-10% Fe), the density of the green compact of the interconnect can achieve 90% of the theoretical density only if the pressure applied in the pressing process is equal to or over 8 mt/cm$^2$.

High temperature alloy usually includes chrome, nickel or cobalt as base composition. Oxide layers such as chromium oxide or nickel oxide or cobalt oxide will be naturally formed on the surface of chrome, nickel or cobalt alloys in an environment with oxygen to protect the alloys against high temperature oxidation. However, the thickness of the oxide layer will increase parabolically along with the increasing oxidation time. The area specific resistance (ASR) will also increase with the thickness of the oxide layer causing the reduction of conductivity of the interconnect in the minimum service life (10000 hr) of the SOFC.

A ceramic protecting process is typically performed on at least one surface of the interconnect body formed by the sintering to complete the interconnect. The ceramic layer can overcome and improve the poor conductivity of metal oxide. The ceramic layer can also be a protecting layer to increase the resistance against high temperature oxidation. The ceramic protecting process comprises plasma spray, air plasma spray (APS), chemical vapor deposition (CVD), plasma sputtering, and screen printing.

The ceramic material used in the ceramic protecting process comprises lanthanum strontium-doped manganite (LSM), lanthanum-strontium ferrite (LSF), lanthanum-strontium cobaltite (LSC), and lanthanum-strontium cobaltite ferrite (LSCF).

For chrome base alloy, LSM is a suitable ceramic material used in the ceramic protecting process. The oxide of LSM, $La_{1-x}Sr_xMnO_3$ (LSMO) with Perovskite, is used as the material of the cathode of the SOFC. The thermal expansion coefficient of the LSMO matches that of other components of the SOFC regardless of the composition or proportion. LSMO is a suitable ceramic material used in the ceramic protecting process in view of its good conductivity and strength against high temperature oxidation.

Using LSMO to cover the surface of metal material can protect the metal material from direct contact with an oxidizing environment. Chrome atoms which evaporate easily at high temperature will react with manganese atoms in LSMO to form $MnCr_2O_4$ and to decrease the evaporation of chrome atoms. The formation of $MnCr_2O_4$ affects the conductivity of the oxide layer. The resistance of $Cr_2O_3$ is about 100 times larger than that of $MnCr_2O_4$. The conductivity of the oxide layer can be improved when the structure of the oxide layer is changed from a single $Cr_2O_3$ layer to a composite layer of $Cr_2O_3$ and $MnCr_2O_4$ due to the higher conductivity of $MnCr_2O_4$. As the composition of $MnCr_2O_4$ increases, so does the conductivity of the composite oxide layer. Moreover, since the inner layer of the composite oxide layer is a condense $Cr_2O_3$ layer, the composite oxide layer still maintains a superior prospective property against high temperature oxidation.

A method for forming an interconnect of a solid oxide fuel cell is disclosed in a second embodiment of the invention. The method comprises providing a powder mixture substantially comprising equal to or more than 90 wt % chrome powder with the balance being iron powder and inevitable impurities, performing a pressing process on the powder mixture with a pressure equal to or over 8 mt/cm$^2$ to form a green interconnect with a density being equal to or over 90% of the theoretical density, and performing a sintering process on the green interconnect to form an interconnect body. A protecting process is then performed on at least one surface of the interconnect body to form an interconnect. The detail of the sintering and protecting processes can be the same as those of the first embodiment.

In one example of this embodiment, the powder mixture/metal powder set forth is neither mechanical alloy nor master alloy. The powder mixture/metal powder excludes rare earth metals, rare earth metal oxide, yttrium or yttria.

In another example of this embodiment, the density of the green interconnect increases as the pressure applied in the pressing process increases by a CNC hydraulic pressing machine.

A method for forming an interconnect body of a solid oxide fuel cell is disclosed in a third embodiment of the invention. According to the method, a powder mixture substantially comprising equal to or more than 90 wt % chrome powder, with the balance comprising one or more of iron powder and impurities, can be provided. Then a pressing process can be performed on the powder mixture with a pressure equal to or over 8 mt/cm$^2$ to form a green interconnect with a density being equal to or over 90% of the theoretical density. Finally, a sintering process can be performed on the green interconnect to form an interconnect body.

In one example of this embodiment, the powder mixture/metal powder set forth is neither mechanical alloy nor master alloy, and/or the powder mixture/metal powder excludes rare earth metals, rare earth metal oxide, yttrium and/or yttria.

In another example of this embodiment, the density of the green interconnect increases as the pressure applied in the pressing process increases by a CNC hydraulic pressing machine.

Although specific embodiments have been illustrated and described, it will be appreciated by those skilled in the art that various modifications may be made without departing from the scope of the present invention, which is intended to be limited solely by the appended claims.

What is claimed is:

1. A method for forming an interconnect of a solid oxide fuel cell, said method comprising:
   providing a powder mixture, wherein the powder mixture includes a metal powder and a lubricant, the metal powder being pure powder mixture, neither mechanical alloy nor master alloy, the metal powder comprising an amount equal to or more than 90 wt % chrome powder, with the balance being iron powder and inevitable impurities, wherein the metal powder excludes rare earth metals, rare earth metal oxide, yttrium or yttria;

performing a single pressing process on the powder mixture by a computer numerical control (CNC) hydraulic pressing machine to form a green interconnect;

performing a single sintering process on the green interconnect to form an interconnect body; and performing a protecting process on at least one side of the interconnect body to form the interconnect without additional pressing process and additional sintering process.

2. The method according to claim 1, wherein the sintering process is performed in one or more of a protective atmosphere and a vacuum environment.

3. The method according to claim 1, wherein the temperature of the sintering process is equal to or over 1350° C.

4. The method according to claim 1, wherein the protecting process comprises a ceramic protecting process.

5. A method for forming an interconnect of a solid oxide fuel cell, said method comprising:

providing a powder mixture comprising 90 wt % or more of chrome powder, with the balance being iron powder and inevitable impurities, wherein the chrome powder and iron powder are pure metal powder, neither mechanical alloy nor master alloy, the powder mixture excludes rare earth metals, rare earth metal oxide, yttrium or yttria;

performing a single pressing process on the powder mixture by a computer numerical control (CNC) hydraulic pressing machine;

performing a single sintering process on the green interconnect to form an interconnect body; and performing a protecting process on at least one surface of the interconnect body to form an interconnect without additional pressing process and additional sintering process.

6. The method according to claim 5, wherein the density of the green interconnect increases as the pressure applied in the pressing process increases.

7. The method according to claim 5, wherein the sintering process is performed in one or more of a protective atmosphere and a vacuum environment.

8. The method according to claim 5, wherein the temperature of the sintering process is equal to or over 1350° C.

9. The method according to claim 5, wherein the protecting process comprises a ceramic protecting process.

10. A method for forming an interconnect body of a solid oxide fuel cell, said method comprising:

providing a powder mixture at or above about 90 wt % chrome powder, with the balance comprising one or more of iron powder and impurities, wherein the chrome powder and iron powder are pure metal powder, neither mechanical alloy nor master alloy, the powder mixture excludes rare earth metals, rare earth metal oxide, yttrium or yttria;

performing a single pressing process on the powder mixture by a computer numerical control (CNC) hydraulic pressing machine; and performing a single sintering process on the green interconnect to form an interconnect body without additional pressing process and additional sintering process.

11. The method according to claim 10, wherein the density of the green interconnect increases as the pressure applied in the pressing process increases.

12. The method according to claim 10, wherein the sintering process is performed in an environment including one or more of a protective atmosphere and a vacuum environment.

13. The method according to claim 10, wherein the temperature of the sintering process is equal to or over 1350° C.

14. The method according to claim 12, wherein the protective atmosphere comprises a mixture of $H_2$ and $N_2$.

15. The method according to claim 12, wherein the protective atmosphere comprises argon.

16. The method according to claim 1, wherein the metal powder comprises 90 wt % chrome powder and 10 wt % iron powder, the hydraulic pressing machine is at a pressure equal to or over about 10 mt/cm$^2$, and the density of the green interconnect is greater than 92% of a theoretical density.

17. The method according to claim 1, wherein the single pressing process is performed at a pressure equal to or over 8 mt/cm$^2$.

18. The method according to claim 17, wherein when the pressure in the single pressing process reaches 8 mt/cm$^2$, the green compact has a density equal to or over 90% of a theoretical density.

19. The method according to claim 5, wherein the single pressing process is performed at a pressure equal to or over 8 mt/cm$^2$.

20. The method according to claim 19, wherein when the pressure in the single pressing process reaches 8 mt/cm$^2$, the green compact has a density equal to or over 90% of a theoretical density.

21. The method according to claim 10, wherein the single pressing process is performed at a pressure equal to or over 8 mt/cm$^2$.

22. The method according to claim 21, wherein when the pressure in the single pressing process reaches 8 mt/cm$^2$, the green compact has a density equal to or over 90% of a theoretical density.

* * * * *